United States Patent Office 3,250,218
Patented May 10, 1966

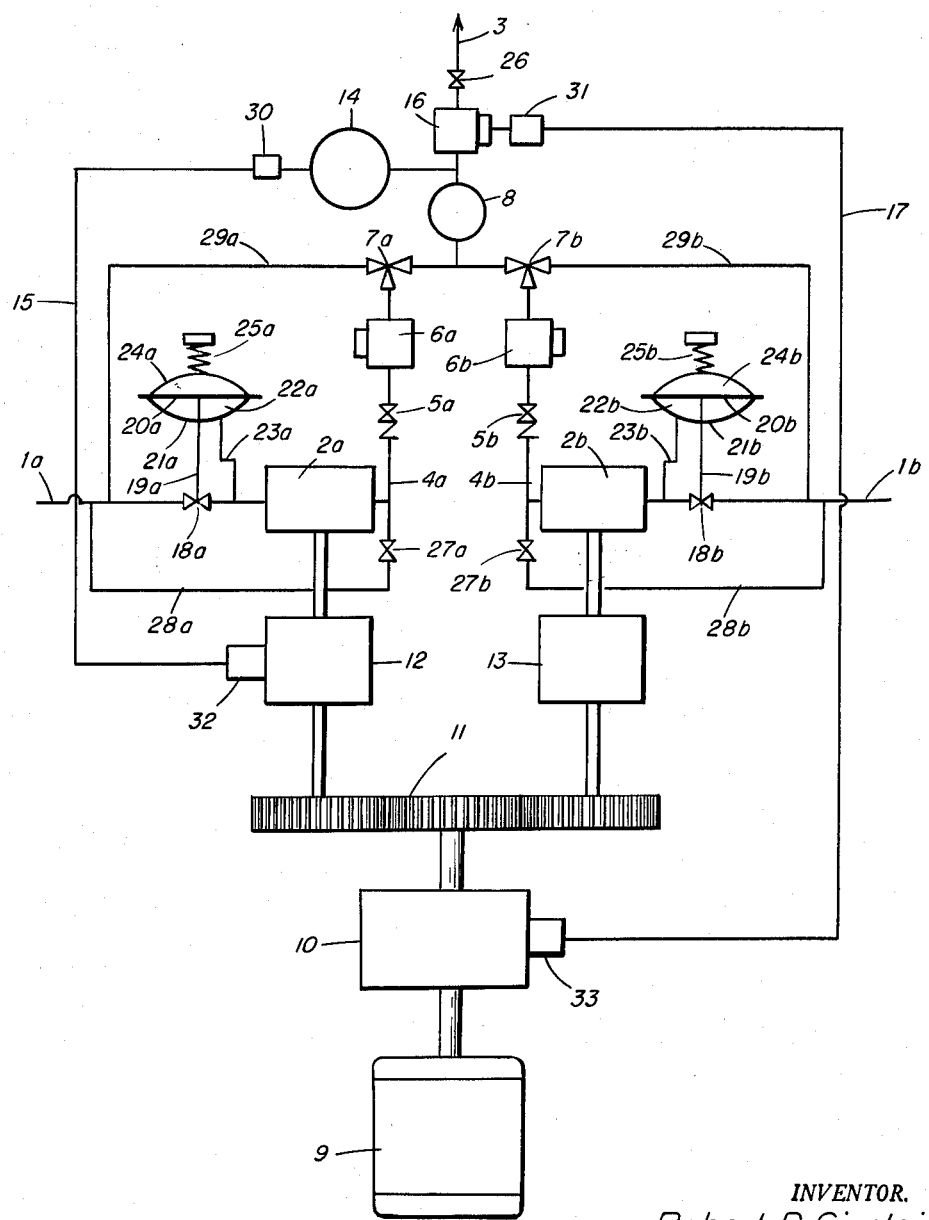

3,250,218
BLENDING APPARATUS
Robert Dickie Sinclair, New Barnet, England, assignor, by mesne assignments, to Socony Mobil Oil Company, Inc., New York, N.Y., a corporation of New York
Filed Nov. 9, 1961, Ser. No. 151,222
Claims priority, application Great Britain, Nov. 11, 1960, 38,893/60
5 Claims. (Cl. 103—11)

This invention relates to an improved pumping apparatus and method utilising a plurality of pumps. It is especially concerned with blending a plurality of liquids together in any desired ratio and maintaining the ratio substantially constant, even over wide variations in rate of flow. The invention also provides means for rapidly and readily changing the ratio of the blend components.

A typical example of the need for the invention is in the oil industry where it is desired to pump oils of different character from various containers into a single output pipe to dispense a blended oil of a desired composition. The ratios of the different oil ingredients must be strictly maintained at the values desired. This is often difficult to control in view of variations and fluctuations in the efficiency of pumps and pumping systems. This can be a problem even when one is maintaining a steady and constant flow in the output pipe, such as would be the case if one were pumping various oils from different containers into a blended feed line passing to a very large container, this being an uninterrupted procedure operated at constant flow.

This difficulty of maintaining a constant ratio of the respective outputs from blending pumps has often been avoided in the past by so-called "batch blending." This involved introducing the blend components separately into a large container in the requisite quantities and then stirring, e.g. for a 50–50 blend of two oils, one would fill half the container with one oil, then fill the remainder of the container with the other oil, and then stir together. This is obviously a crude method which was only necessitated by the aforedescribed difficulty.

The problem is greatly aggravated when one desires to have infinitely variable flow in the outlet pipe. An object of the present invention is to provide an apparatus which can be used under these circumstances with satisfactory results, but which can be simple and cheap to construct.

It is also an object of the present invention to provide a blending apparatus which provides means for rapidly and readily changing the ratio of the blend components under conditions of substantially constant rate of flow in the outlet pipe. Under these circumstances, the apparatus can be even simpler than that required for infinitely variable flow.

According to the invention, a pump system for feeding fluid to a common outlet pipe comprises a plurality of positive displacement pumps wherein at least one of the pumps is driven through variable speed gears, a monitoring device connected to the outlet pipe and responsive as hereinafter defined to at least one property of the blended fluid in the outlet pipe, and a fine control connection between the monitoring device and the variable speed gears whereby the speed of the latter is controlled by the monitoring device.

The positive displacement pumps referred to herein are known. They are pumps having means for positively displacing the fluid being pumped, e.g. pistons, vanes or screws. From the point of view of economy, it is preferred to use invariable volume pumps, but variable volume pumps can be used if desired.

The ratio of the volumes of fluid delivered by the various pumps can be varied at will by adjusting the variable speed gears, which are suitably contained in at least one variable speed gear box. Various combinations of pumps and gear boxes may be used; for example, the pumps may be driven by separate motors acting through separate gear boxes, some or all of which are variable speed gear boxes and the others, if any, are fixed speed gear boxes.

Alternatively, some or all of the pumps may be driven by a single motor acting through different sets of gears, at least one of such gears being variable in speed. Any pump running constantly at a fixed speed may be driven by a motor without a gear box.

The monitoring device is fitted to the outlet pipe, i.e. to that part of the system through which flows the blended fluid from two or more of the pumps. The monitoring device is any device capable of measuring some property of the blended fluid in the outlet pipe which depends on the ratio of the volumes of the different fluids composing the blend.

The monitoring device may be a viscosity meter, but other devices, e.g. density meters, colorimeters, or (if any of the liquids are radioactive or made radioactive) Geiger counters or other radiation responsive devices may be used.

A deviation from the required value of the property of the blended fluid (in the outlet pipe) which is measured by the monitoring device causes the latter to act on the individual variable speed gear boxes, e.g. through the intermediary of levers, electric circuits, or other suitable means, in order to adjust the ratio of the pump speeds and hence the ratio of the blend so as to restore the said blend property to its required value.

In the preferred embodiment of the invention, the monitoring device is connected through an electric switch to an electric motor capable of changing the gear ratios of the individual variable speed gear boxes. The switch can be actuated by the viscosity meter in either of two directions, so that the electric motor may be caused to increase or to decrease these gear ratios in response to any change in the viscosity of the blended fluid in the outlet pipe, so as to maintain this viscosity at the desired value.

The foregoing system is most suitable for operation at substantially constant flow in the outlet pipe. If the system is to be used at variable rates of flow in the outlet pipe, one has to counteract the effect of back pressure in the system when flow in the outlet pipe is being reduced. By-pass valves and pipes are often provided on pumps to bleed off such back pressure, but in the present system of blending one would not wish to use a by-pass for this purpose except for emergencies in view of the delicate balance of factors required for fine blending. The by-pass valves would have to be of very delicate calibration and would have to be mutually synchronised. Such a valve system would be expensive and difficult to produce.

It is therefore preferred to counteract this back pressure, produced when flow in the outlet pipe is being reduced, by adjusting the speed of the pumps in accordance with the flow in the outlet pipe. In such a case, it is preferred that all the pumps be driven as described above through individual gear boxes (of which at least one is a variable speed gear box responsive to the monitoring device). These individual gear boxes are in turn driven by a motor through an overall controlling variable speed gear box. The latter can be adjusted in response to variations in the flow in the outlet pipe.

In such a preferred system for variable flow, the ratio of the volume outputs in unit time of the various pumps may be kept constant and the overall volume output in unit time of the whole system may be varied by means of the overall controlling variable speed gear box. Means may be provided to enable the overall controlling variable speed gear box to be controlled either by hand or automatically in response to the rate of flow through the outlet pipe of the system. For example, in the preferred system, a flow meter may be connnected to the outlet pipe and, through an electric switch, to an electric motor capable of changing the gear ratio of the overall controlling variable speed gear box; the switch may be actuated by the flow meter in either of two direction, so that the electric motor may be caused to increase or decrease this gear ratio in response to an increase or a decrease in the rate of flow of blended fluid through the outlet pipe. Such increase or decrease may of course be caused by the opening or closing of a cock in the outlet pipe.

The use of the invention will now be illustrated with reference to a system in which two oils of differing viscosity are blended to yield a blended oil of a desired viscosity.

In the flow diagram shown in the drawing herein, different oils from two inlet pipes I$a$ and I$b$ are pumped by two pumps 2$a$ and 2$b$, respectively, to a common outlet pipe 3 through pipes 4$a$ and 4$b$, one-way valves 5$a$ and 5$b$, flow meters 6$a$ and 6$b$, three-way valves 7$a$ and 7$b$ and mixing chamber 8. The pumps are driven by a motor 9 acting through an overall controlling variable speed gear box 10, a fixed speed gear box 11, and two individual gear boxes 12 (variable speed) and 13 (fixed speed) connected respectively to pumps 2$a$ and 2$b$.

A viscosity meter 14 connected to the outlet pipe 3 controls the setting of the gear ratio in the gear box 12 through a connection 15, in the manner described hereinbefore. That is, the viscosity meter 14 is connected through electric switch 30 to electric motor 32 which changes the gear ratio of gear box 12 whereby, in response to viscosity meter 14, switch 30 actuates motor 32 to control the setting of the gear ratio in gear box 12.

A flow meter 16 connected to the outlet pipe 3 controls the setting of the gear ratio in the gear box 10 through a connection 17, in the manner described hereinbefore. That is, the flow meter 16 is connected through electric switch 31 to electric motor 33 which changes the gear ratio of gear box 10 whereby, in response to flow meter 16, switch 31 actuates motor 33 to control the setting of the gear ratio in gear box 10.

In order to equalise the pressure in the inlet pipes I$a$ and I$b$, these inlet pipes are provided with automatic variable orifices 18$a$ and 18$b$ which are actuated by rods 19$a$ and 19$b$. These rods are connected to diaphragms 20$a$ and 20$b$ in diaphragm chambers 21$a$ and 21$b$. In these diaphragm chambers, space 22$a$ is in fluid pressure connection through pipe 23$a$, with that part of inlet pipe I$a$ which connects automatic variable orifice 18$a$ with pump 2$a$. Similarly, space 22$b$ is in fluid pressure connection, through pipe 23$b$, with that part of inlet pipe I$b$ which connects automatic variable orifice 18$b$ with pump 2$b$. Constant equal pressures are applied to space 24$a$ and space 24$b$ by means of spring pressure settings 25$a$ and 25$b$, respectively. The automatic variable orifices ensure that the fluid pressures of the respective oils flowing through these two orifices are equal.

The common outlet pipe 3 can be used for dispensing blended oil to fill containers or oil tank vehicles, and is provided with a cock 26. If the cock 26 is closed and the flow of blended oil through the common outlet pipe suddenly diminished or stopped, the pressure of the oil in the system, e.g., in pipes 4$a$ and 4$b$ and valves 5$a$ and 5$b$, may rise to dangerous values during the short interval of time which may elapse before the flow meter 16 acts upon the overall controlling variable speed gear box 10 so that the action of the pumps 2$a$ and 2$b$ is diminished or stopped. In order to prevent this dangerous rise in pressure, the pipes 4$a$ and 4$b$ are connected to by-pass valves 27$a$ and 27$b$ of the usual construction which open when the pressures in the pipes 4$a$ and 4$b$ rise above a predetermined value and allow oil in these pipes to flow back into the inlet pipes I$a$ and I$b$ through pipes 28$a$ and 28$b$.

Inlet pipe I$a$ is connected as shown to the three-way valve 7$a$ by pipe 29$a$; similarly, inlet pipe I$b$ is connected to three-way valve 7$b$ by pipe 29$b$.

The operation of the above system will now be described with reference to the blending of two oils A and B of viscosities 5000 and 15,000 centistokes, respectively, to give a blended oil of a desired viscosity of 10,000 centistrokes. Oil A is pumped from inlet pipe I$a$ and oil B from inlet pipe I$b$. Pump 2$a$ is deemed to have the same volume capacity as pump 2$b$, and the monitoring device 14 is deemed to be a viscosity meter.

The variable speed gear box 12 is adjusted so that the frequency of pumping cycle of pump 2$a$ is the same as that of pump 2$b$. The system by which the viscosity meter 14 acts on the gear box 12 is adjusted so that this frequency of pump 2$a$ is decreased if the viscosity of the blended oil in the common outlet pipe is less than 10,000 centistrokes, and is increased if the viscosity of the blended oil is greater than 10,000 centistokes.

Three-way valve 7$a$ is firstly adjusted so that it allows fluid to flow from pipe 4$a$ through one-way valve 5$a$ and flow meter 6$a$ into pipe 29$a$, but not into mixing chamber 8. Three-way valve 7$b$ is similarly adjusted so that it allows fluid to flow from pipe 4$b$ through one-way valve 5$b$ and flow meter 6$b$ into pipe 29$b$, but not into mixing chamber 8. The pumps are started and the flow meters 6$a$ and 6$b$ are checked to make sure that equal amounts of oil are being pumped through pipe 4$a$ and pipe 4$b$.

The three-way valves 7$a$ and 7$b$ are then adjusted so that all flow through the pipes 29$a$ and 29$b$ is stopped, and all the oil pumped through pipes 4$a$ and 4$b$ flows into mixing chamber 8. The cock 26 is opened and the blended oil begins to flow out through the outlet pipe 3.

The viscosity of the blended oil first delivered to the common outlet pipe 3 will generally not in practice be exactly the desired viscosity. For example, the pumps will not generally deliver exactly equal volumes of oil since it is very seldom that two pumps have the same efficiency. Moreover, the difference between the efficiencies of the two pumps generally varies as the rate of flow in the output pipe varies. This situation is remedied by the viscosity meter 14. If the meter finds the viscosity of the blended oil in the common outlet pipe to be different from the desired value of 10,000 centistokes, it acts upon the controls of the variable speed gear box 12 so that the frequency of pumping cycle of pump 2$a$ is increased or decreased to correct the proportion of oil A in the blended oil so that the latter's viscosity should be maintained at 10,000 centistokes.

It may be desirable to vary the rate of flow of blended oil in the outlet pipe 3 during the blending operation. It will be necessary to stop this flow at the end of the blending operation.

When the cock 26 is turned, and the rate of flow through the outlet pipe 3 is changed, the flow meter 16 acts on the overall controlling variable speed gear box 10, in the manner hereinbefore described, so as to change the frequencies of pumping of the two pumps 2$a$ and 2$b$ in response to the changed rate of flow in the outlet pipe. The ratio of the two frequencies is maintained constant unless, of course, the viscosity meter 14 should change it. The two frequencies are thus decreased when the rate of flow in the outlet pipe decreases, and increased when it increases.

If the rate of flow in the outlet pipe 3 is suddenly and greatly decreased, the pressure in the system, e.g. in flow meters 6$a$ and 6$b$ and pipes 4$a$ and 4$b$, may rise to a dangerous value during the short period of time which may elapse before the flow meter 16 acts on the overall controlling variable speed gear box 10 so that the action of the pumps 2$a$ and 2$b$ is sufficiently diminished. In such a case, the by-pass valves 27$a$ and 27$b$ open and remain open until the action of the pumps is sufficiently diminished.

The system shown in the accompanying flow diagram is especially suited for use under conditions of variable rates of flow in the outlet pipe. It is of course also suited for use when the rate of flow in the outlet pipe is kept constant during each pumping operation. In the latter case, one may prefer to use a simpler system which does not comprise means for adjusting the frequencies of the pumps in response to the rate of flow in the outlet pipe. Such a simpler system may be, for example, similar to that shown in the flow diagram, except that the overall controlling variable speed gear box 10, the flow meter 16, and the connection 17 may be omitted. The two individual gear boxes 12 and 13 may be driven directly by the motor, with or without the fixed speed gear box 11; alternatively the individual gear boxes may be driven by separate motors.

For the sake of convenience in describing the apparatus, reference has been made herein to "gear boxes." It is to be understood that the term "gear box" as used herein refers to a system of gears which may or may not be enclosed in a casing. Hence in the description of apparatus herein, the various "gear boxes" referred to may be systems of gears of which all, some, or none, may be contained in a single casing or a number of casings.

What I claim is:

1. A pump system for the in-line blending of petroleum products comprising a plurality of pumps, means for feeding a petroleum component fluid to one of said pumps and separate means for feeding another petroleum component fluid to another of said pumps, pump outlet means for passage of fluids discharged from each of said pumps into a common outlet means, a monitoring means associated with said common outlet means which generates a signal representative of at least one property of the blended petroleum fluid in said outlet means, said property being a petroleum quality indicator dependent on the ratio of the volumes of said component fluids in said blended fluid, flow-measuring means which generates a signal representative of the rate of flow of the blended fluid in said common outlet means, ratio control means operatively responsive to the signal from said monitoring means to control the rate of flow of one fluid relative to the rate of flow of another fluid to maintain said blended petroleum property at its required value and flow control means for said component fluids operatively responsive to the signal from said flow-measuring means for increasing or decreasing the total output of said pump system.

2. A pump system, adapted for blending a plurality of petroleum component fluids, comprising a plurality of positive displacement pumps, means for feeding a fluid to one of said pumps and separate means for feeding another fluid to another of said pumps, means for passage of fluid discharge from each of said pumps into a common outlet means, a monitoring means associated with said outlet means responsive to at least one property of the blended fluid in said outlet means, flow-measuring means responsive to the rate of flow of the blended fluid in said outlet means, a plurality of individual gear boxes each one of which is adapted for driving one of said pumps and at least one of which is an individual variable speed gear box, ratio control means responsive to said monitoring means to control the speed of at least one of said individual variable speed gear boxes and flow control means for varying the volumetric output rates of all of said pumps in response to said flow-measuring means.

3. A pump system according to claim 2, in which said flow control means comprises an overall variable speed gear box adapted for driving all of said individual gear boxes and means for controlling the speed of said overall variable speed gear box.

4. A pump system according to claim 3, in which said flow-measuring means comprises a flow meter connected to said outlet means, and said means for controlling the speed of said overall variable speed gear box comprises an electric motor adapted to change the gear ratio of said overall variable speed gear box and switch means to actuate said motor responsive to said monitoring means to change said gear ratio in a predetermined relationship to a change in said rate of flow through said outlet means.

5. A pump system according to claim 2, in which said monitoring means is responsive to at least one property of the blended fluid dependent on the ratio of the volumes of said fluids in said blended fluid, and said ratio control means is adapted to automatically control the speed of at least one of said individual variable speed gear boxes in response to said property of the blended fluid in said outlet means.

References Cited by the Examiner

UNITED STATES PATENTS

| 2,312,111 | 2/1943 | McKinnis | 103—35 |
| 2,408,851 | 10/1946 | Hillier | 230—15 |
| 2,532,792 | 12/1950 | Svensjo | 137—92 |
| 2,638,847 | 5/1953 | McGowan. | |
| 2,654,326 | 10/1953 | Sheen et al. | 103—35 |
| 2,672,405 | 3/1954 | Sheen | 103—6 |
| 2,847,196 | 8/1958 | Franklin et al. | 259—8 |
| 2,910,943 | 11/1959 | Marshall | 103—11 |
| 2,953,460 | 9/1960 | Baker | 259—7 |
| 3,023,764 | 3/1962 | Dooley | 103—11 |

LAURENCE V. EFNER, *Primary Examiner.*

F. PINCKNEY, *Assistant Examiner.*